(12) United States Patent
McKelvey et al.

(10) Patent No.: US 6,819,960 B1
(45) Date of Patent: Nov. 16, 2004

(54) INDUSTRIAL CONTROLLER AUTOMATION INTERFACE

(75) Inventors: Jeffrey A. McKelvey, Brookfield, WI (US); Mike D'Amico, East Troy, WI (US)

(73) Assignee: Rockwell Software Inc., Milwaukee, WI (US)

( * ) Notice: Subject to any disclaimer, the term of this patent is extended or adjusted under 35 U.S.C. 154(b) by 348 days.

(21) Appl. No.: 09/928,623

(22) Filed: Aug. 13, 2001

(51) Int. Cl.[7] .............................................. G05B 11/01
(52) U.S. Cl. ............................ 700/17; 700/18; 700/19; 700/83; 700/86; 345/418; 345/419; 345/420
(58) Field of Search ............................. 700/17, 18, 19, 700/20, 83–89; 345/418, 419, 420

(56) References Cited

U.S. PATENT DOCUMENTS

| | | | | |
|---|---|---|---|---|
| 4,410,983 A | * | 10/1983 | Cope | 710/100 |
| 5,127,090 A | * | 6/1992 | Ruehle et al. | 709/246 |
| 5,555,179 A | * | 9/1996 | Koyama et al. | 700/95 |
| 5,805,442 A | | 9/1998 | Crater et al. | 364/138 |
| 5,812,394 A | | 9/1998 | Lewis et al. | 364/146 |
| 5,978,578 A | * | 11/1999 | Azarya et al. | 717/100 |
| 6,105,093 A | * | 8/2000 | Rosner et al. | 710/105 |
| 6,122,713 A | * | 9/2000 | Huang et al. | 711/147 |
| 6,154,684 A | | 11/2000 | Schwenke et al. | 700/159 |
| 6,167,406 A | | 12/2000 | Hoskins et al. | 707/102 |
| 6,201,996 B1 | | 3/2001 | Crater et al. | 700/9 |
| 6,560,235 B1 | * | 5/2003 | Jones | 370/401 |
| 2002/0174178 A1 | * | 11/2002 | Stawikowski | 709/203 |
| 2002/0191023 A1 | * | 12/2002 | Chandhoke et al. | 345/771 |

FOREIGN PATENT DOCUMENTS

| | | |
|---|---|---|
| DE | 29600609 | 2/1997 |
| DE | 19850469 | 5/2000 |
| EP | 0825506 | 2/1998 |
| EP | 1284446 A1 * | 2/2003 ........... G05B/91/05 |

OTHER PUBLICATIONS

OPC Common Definitions X–002138398 Oct. 27, 1998.
Automatisieren OLE for Process Control XP–000947452 Nov. 30, 1999 Author: Dr. –Ing. Andreas vom Hemdt.
OPC—kunftig Standard fur Visualisierungs—und Feldbus-systeme XP–000735989 Jul. 1, 1997 Author: Steffen Himstedt and Rico Muller.
OPC Unites Industrial Automation Systems XP–000832910 vol. 1, 1997 Author: Don Holley.
Wird OLE for Process Control (OPC) ein neuer Industri-estandard? XP–000689324 May 1, 1997 Author: Jurgen Schmoll, Nurnberg.
European International Search Report Dated: Dec. 5, 2002 European Application Ser. No.: EP25134/Eb.

* cited by examiner

Primary Examiner—Ramesh Patel
(74) Attorney, Agent, or Firm—Amin & Turocy, LLP; William R. Walbrun

(57) ABSTRACT

An automation interface is provided for interacting with industrial controllers. The automation interface provides for programming, editing, monitoring and maintenance of industrial controllers programmatically from a local or remote location. The automation interface component is adapted to communicate with industrial controllers by integrating a computer process interface library into the automation interface component. The computer process interface library exposes the automation interface component to client application processes, so that the client application processes can communicate with the at least one industrial controller programmatically. The automation interface is provided with functionality for downloading, uploading and programming of control programs to the processors of the industrial controllers.

26 Claims, 10 Drawing Sheets

INDUSTRIAL CONTROLLER AUTOMATION INTERFACE

TECHNICAL FIELD

The present invention generally relates to industrial control systems and in particular to an automation interface for industrial controllers.

BACKGROUND OF THE INVENTION

Industrial controllers are special purpose computers used for controlling factory automation devices. Under the direction of a stored program, a processor of the industrial controller examines a series of inputs reflecting the status of a controlled process or device and changes outputs affecting control of the controlled process or device. Generally industrial controllers are constructed in modular fashion to accommodate different application requiring different numbers and types of input/output (I/O) circuits as is determined by the particular device or process being controlled. The stored control program runs in real-time to provide outputs to the controlled process as electrical signals to outputs such as actuators and the like. The outputs are based on the logic of the control program and inputs received from sensors of the controlled process.

The industrial controller or programmed logic controller (PLC) executes a series of operations that are performed sequentially and repeatedly. In general, the series of operations includes an input scan, a program scan and an output scan. During the input scan the PLC examines the on or off state of the external inputs and saves these states temporarily in memory (e.g., a file). During the program scan the PLC scans the instruction of the program and uses the input status to determine if an output will be energized. The output results are then saved to memory (e.g., a file). During the output scan the controller will energize or de-energize the outputs based on the output results stored in memory to control the external devices.

A conventional language for programming the stored program is relay ladder logic. Each ladder logic program comprises one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and a second input is "on". The ladder logic program not only manipulates single-bit input and output data representing the state of the sensing and operating devices, but also performs arithmetic operations, timing and counting functions and more complex processing operations.

A ladder program can be created by connecting a special input module to a PLC that includes a small keyboard and entering ladder logic statements directly into the memory of the PLC. Another method of creating a ladder logic program involves, utilizing a ladder logic program development/editor tool residing on a separate device, such as a personal computer. An operator or programmer of the personal computer draws a series of ladder logic graphs representing each rung or instruction directly on the computer display screen. Once the ladder logic program is complete, the PC software converts the graphs into the corresponding ladder logic commands. The ladder logic command are then transferred to the PLC and stored in the PLC memory.

A PLC and/or a personal computer device can store one or more ladder logic programs and versions. However, a user must manually upload, download, edit and develop ladder logic programs at a work station or personal computer running a developer/editor application program. Furthermore, data backup and storage must be manually invoked by an operator through the application program or be conducted through another system separate from the application program. Accordingly there is an unmet need in the art to provide an improved system and method for developing, editing, replacing and monitoring industrial control programs and/or data associated with a controlled process involving the industrial controller.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method for providing an automation interface for interacting with industrial controllers. The automation interface provides for programming, editing, monitoring and maintenance of industrial controllers programmatically from a local or remote location. The automation interface component is adapted to communicate with industrial controllers by integrating a computer process interface library into the automation interface component. The computer process interface library exposes the automation interface component to client application processes, so that the client application processes can communicate with the at least one industrial controller programmatically. The automation interface is provided with functionality for downloading, uploading and programming of control programs to the processors of the industrial controllers.

The automation interface also allows for data associated with one or more control processes to be accessible programmatically. The data can be used to determine status information of the one or more control processes or logged for later analysis. The automation interface can be exposed to a web service, such that industrial controllers can be accessed via the Internet. Data associated with one or more control processes can be logged at a third party data store, so that system backup can be outsourced.

The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

Figure 1:
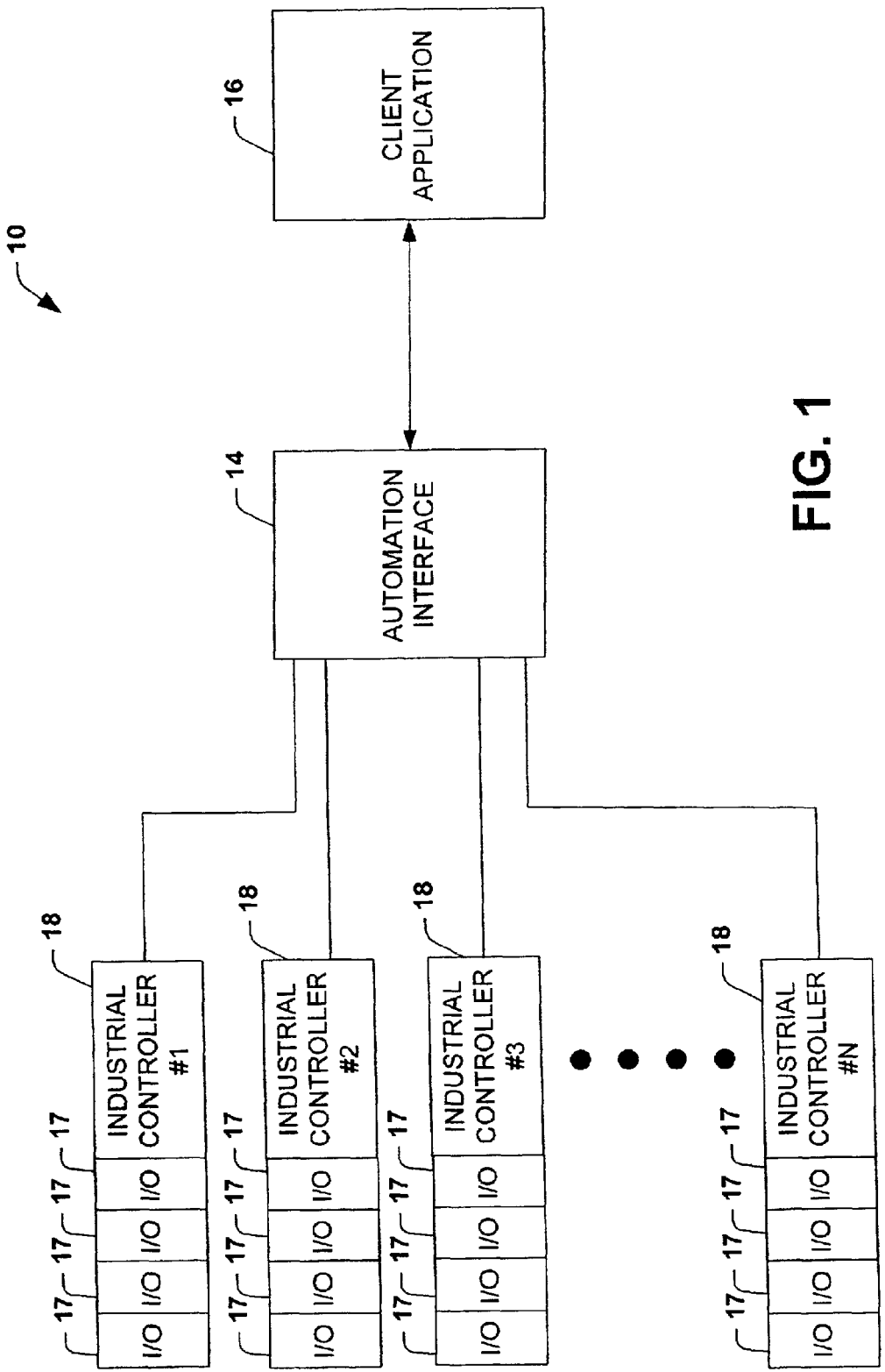
FIG. 1 illustrates a block schematic diagram of a system employing an automation interface in accordance with one aspect of the present invention.

The present invention will now be described with reference to the drawings. The present invention will be described with reference to a system and method for providing an automation interface for interacting with industrial controllers. The automation interface provides for programming, editing, monitoring and maintenance of industrial controllers programmatically. For example, one or more control programs associated with an industrial controller or programmable logic controller (PLC) can be created and/or edited locally or remotely via the automation interface. The automation interface also allows for monitoring and maintenance to be provided by exposing the automation interface to local and remote applications. For example, data associated with one or more control processes can be accessed programmatically. The data can be used to determine status information of the one or more control processes or logged for later analysis. Furthermore, process parameters and/ or control programs can be changed programmatically such that operator intervention is eliminated. The present system and method may be implemented utilizing hardware, software or a combination of both hardware and software.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

The present examples will be illustrated with respect to providing an automation interface having a set of objects conforming to the Component Object Model (COM) developed by Microsoft Corporation of Redmond, Wash. COM is an object-oriented programming model that provides a standard as to how objects within a single application or between applications (e.g., client/server applications) interact and communicate. COM defines a set of standard interfaces, which are groupings of semantically related functions through which a client application accesses the services of, for example, a server application. The present example is provided with respect to integrating a COM interface, such as IDispatch, into an executable program (.exe) to provide for remote automation across a network. It is appreciated that a variety of other mechanisms (e.g., interfaces) can be employed to provide both remote and local access to the automation interface of the present invention. For example, communications through computer processes can occur through Dynamic Data Exchange (DDE), named pipes and shared memory to name a few. Other mechanisms of providing communications between processes would be apparent to those skilled in the art of computer programming.

FIG. 1 illustrates a system 10 for interacting programmatically to one or more industrial controllers or industrial controllers 18 through an automation interface 14. Each of the industrial controllers are coupled to one or input/output (IO) modules 17 through a common backplane. A client application 16 can communicate to the one or more industrial controllers through the automation interface 14. The automation interface 14 and the client application 16 operate as separate computer processes. The automation interface 14 is a stand alone executable file provided with one or more components having one or more computer process interfaces compiled therein. The one or more computer process interfaces allow the client application to access the one or more components either locally or remotely. The automation interface has a visible mode provided with a user interface and an invisible mode where no user interface is provided.

For example, if the automation interface 14 includes compiled COM libraries, the client application can access the automation interface through a local procedure call (LPC) or a remote procedure call (RPC). A set of proxies and stubs (DLLS) are provided to marshall and unmarshall parameters associated with local and remote calls. The automation interface 14 is provided with a set of classes (e.g., C++, JAVA, C#) or functions having functionality for communicating with one or more industrial controllers residing in a work environment (e.g., a factory floor). The set of classes include functionality for uploading, downloading, editing and creating of control programs of one or more industrial controllers. Additionally, the set of classes include functionality for accessing control process data for monitoring and storage of the control process data. Data table values in controller memory can be accessed and edited programmatically through the automation interface 14.

Figure 2:
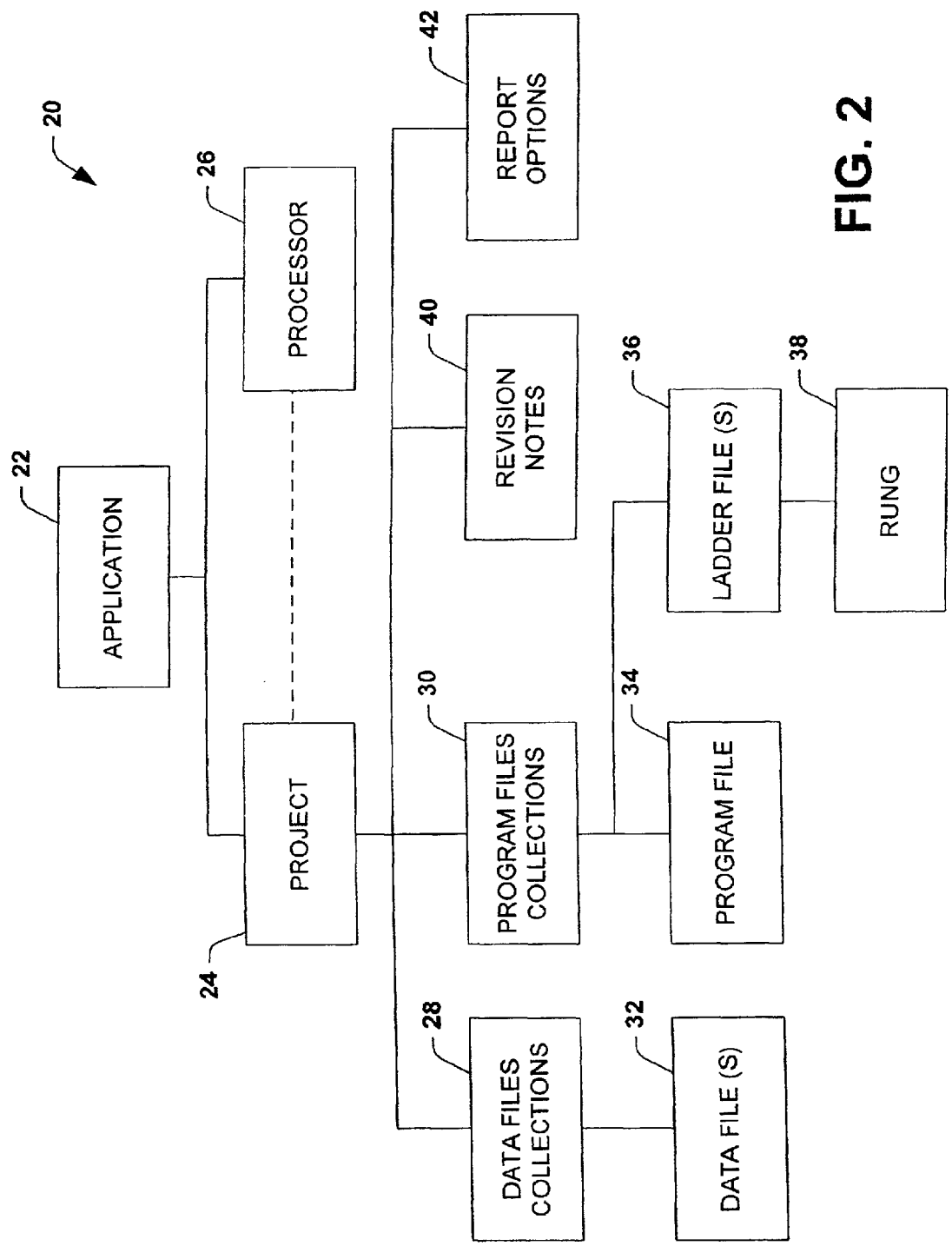
FIG. 2 illustrates a block diagram of a tree structure of components associated with the automation interface in accordance with one aspect of the present invention.

FIG. 2 illustrates an example of an object or class tree 20 associated with the automation interface 14. Each of the objects can have one or more properties, methods and events associated with the object. The object or class tree includes a top level application object 22 from which all other objects within the object tree can be accessed. The application object 22 is the main object interface for client applications. The application object 22 represents the topmost object used to access other objects and perform top level operations. A call to an application object creates an instance of that class in memory and represents the automation interface to the client application. A project object 24 is associated with each industrial controller. The project object 24 can be obtained from the application object 22 through one or more methods. The application object 22 can have one more project objects 24 meaning that an application object 22 can access and/or edit control programs of one or more industrial controllers. A processor object 26 is provided, which represents the processor being used with a current project.

A program files collection object 30 is provided which represents all of the program files in a project. The program files collection object 30 can be a property of the project object 24. The program file object 34 represents the basic functionality of a program file and can be contained from the program files collection object 30. One or more program files 34 can be associated with the program files collections object 30. A data files collection object 28 is provided, which represents a collection of data files associated with the project. The data files collections object 28 can be a property of the and can be obtained from the data files collections object 30. One or more data files can be associated with the data files collections object 28.

A ladder file object 36 represents a ladder file in the project/processor. The ladder file object 36 can be obtained from the program files collections 30. A rung object 38 is provided, which represents a rung of ladder logic that can be inserted, deleted or retrieved and edited in a ladder file object 36. A revision notes object 40 if provided that represents the revision notes associated with any project. A reports option object 42 represents the report settings associated with a project.

It is to be appreciated that the object tree 20 is but one example of a possible implementation to carry out the functionality associated with the automation interface in accordance with the present invention. Of course, many variations and modifications could be construed by those skilled in the art.

Figure 3:
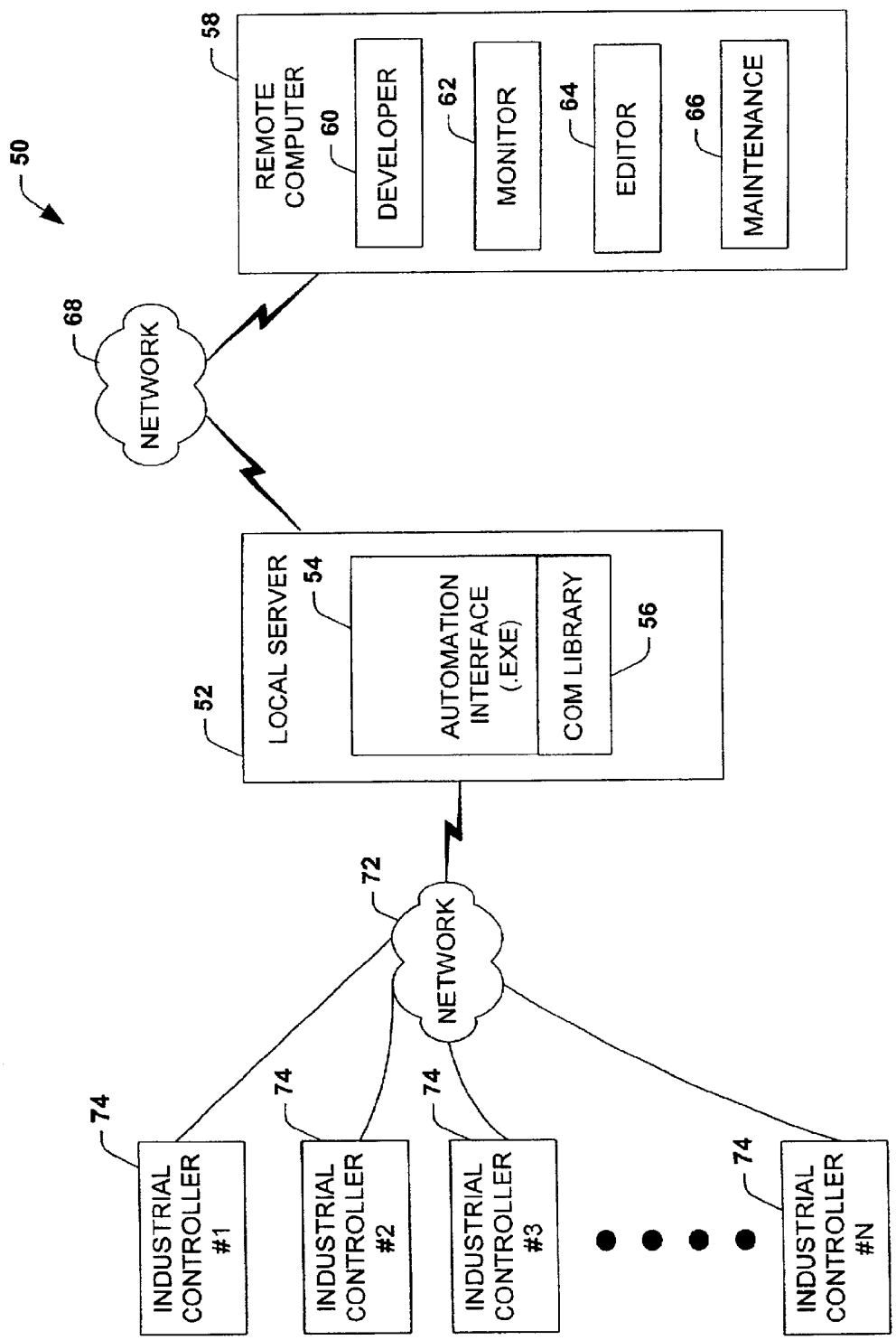
FIG. 3 illustrates a block schematic diagram of a remote computer interacting with the automation interface residing on a local server in accordance with one aspect of the present invention.

FIG. 3 illustrates a system 50 for interacting programmatically to one or more industrial controllers 74 via a remote computer 58 in accordance with one aspect of the present invention. An automation interface 54 resides on a local server 52. The automation interface 54 is a binary executable program having at least one COM library 56 compiled therein. The COM library 56 provides the automation interface 54 with one or more computer process interfaces to allow communication to occur between the automation interface 54 and one or more computer processes located locally or remotely. The local server 52 is coupled to one or more industrial controllers 74 through a network 72 (e.g., local network, factory network). The network 72 allows communication to occur between the automation interface 54 and the one or more industrial controllers 74.

The remote computer 58 is coupled to the local server 52 through a network 68 (e.g., company intranet, Internet). The remote computer 58 includes one or more application programs for communicating to the industrial controllers 74 at one or more factory locations. The remote computer 58 includes a developer application 60 for developing industrial control programs (e.g., ladder logic programs) and downloading those programs to the industrial controllers 74. The remote computer 58 also includes a monitor application 62, which monitors data conditions of controlled processes associated with the industrial controllers 74. An editor application 64 is provided that uploads control programs from one or more or the industrial controllers, edits or allows editing of the control programs in addition to saving and downloading the control programs back to the respective industrial controller. A maintenance application 66 is provided which operates to automatically determine when different control programs are to be invoked and/or replaced with other control programs based on a particular process and/or time period. The maintenance application 66 can also determine periodic intervals for calibrating controlled processes.

The developer application 60, the monitor application 62, the editor application 64 and the maintenance application 66 are but a few examples of implementations that can be employed as a result of exposing the automation interface 54 to remote applications, and provide functionality to the automation interface 54 for uploading, downloading, editing, monitoring, data storing and other functions associated with industrial controller programs, data and processes. Although, the developer application, monitor application, editor application and maintenance application are illustrated as separate applications, the functionality associated with each can be integrated into a single application program. A user interface can be provided to the applications program to allow users to manual control functions, or functions can be controlled programmatically without any user intervention.

Figure 4:
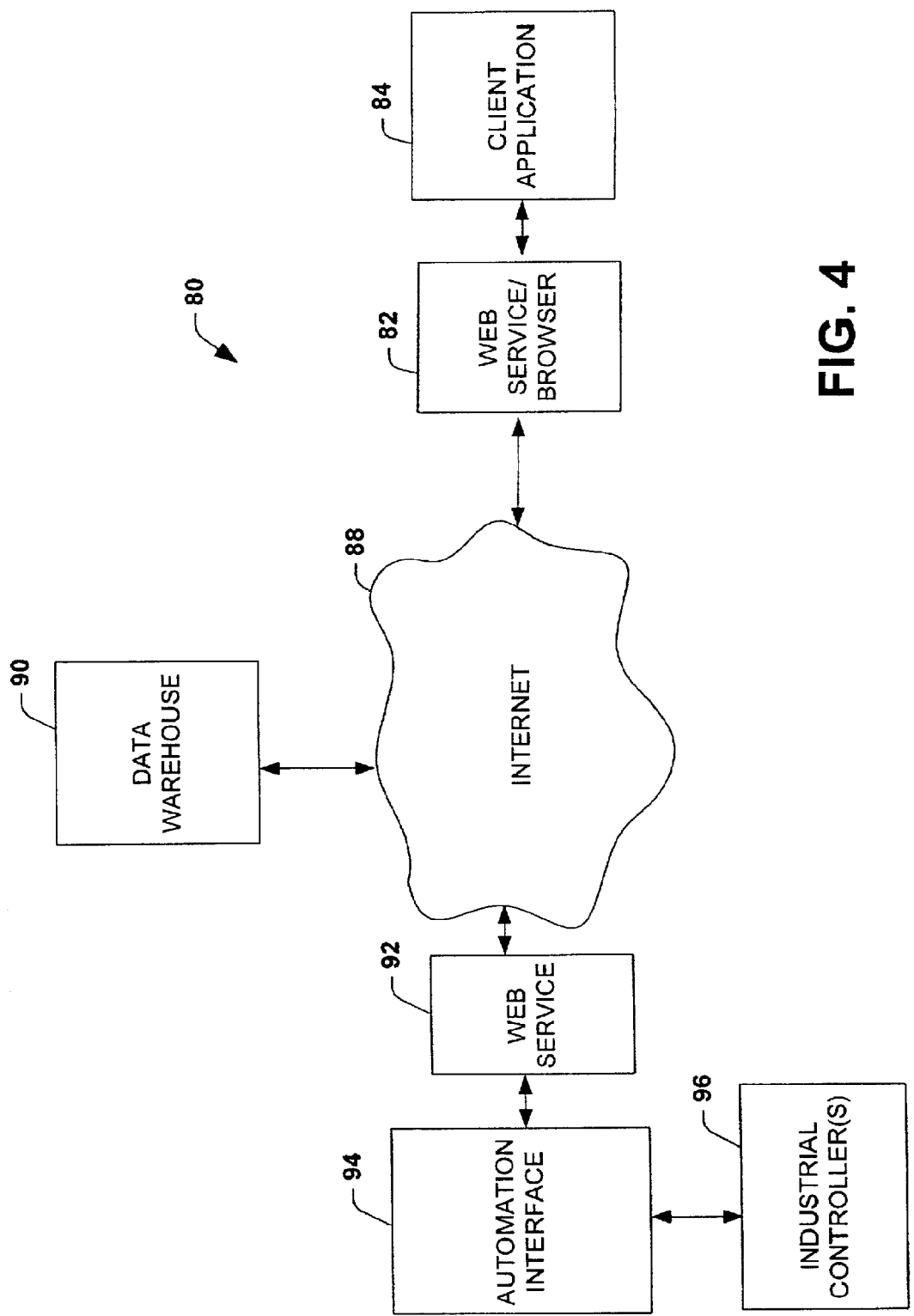
FIG. 4 illustrates a block schematic diagram of a client application accessing the automation interface via the Internet in accordance with one aspect of the present invention.

FIG. 4 illustrates another example of a possible implementation employing the automation interface of the present invention. An automation interface 94 is exposed to a web service 92, which allows communication to the automation interface 94 over the Internet 88. The automation interface 94 is coupled to one or more industrial controllers 96. A client application 84 is coupled to the Internet 88 via a web service and web browser, so that the client application can communicate to the automation interface 94 over the Internet. The automation interface 94 includes functionality for uploading, downloading, editing and creating of control programs of the one or more industrial controllers 96. Additionally, the automation interface 94 includes functionality for accessing control process data for monitoring and storage of the control process data. The client application 84 can call the automation interface 94 through the Internet 88, for example, using TCP/IP protocol and invoke any or all of the services associated with the automation interface 94 and the industrial controller(s) 96 anywhere in the world via an Internet connection. In the example of FIG. 4, the client application periodically downloads backup data to a third party data warehouse 90 at another location different from the client application and the automation interface. The data backup can then be stored and analyzed off-site, such that third party auditing and/or outsourcing can be provided.

Other functions such as editing, development, monitoring and maintenance can be performed by the client application 84 through an Internet connection. Additionally, event-driven HTML reports can be generated by the client application either at the client locations and/or at the location of the industrial controllers. Furthermore, the application data and functionality can be shared with developers within a common environment. Developers can also build their own individualized interfaces that execute functionality within the automation interface through a client application.

Figure 5:
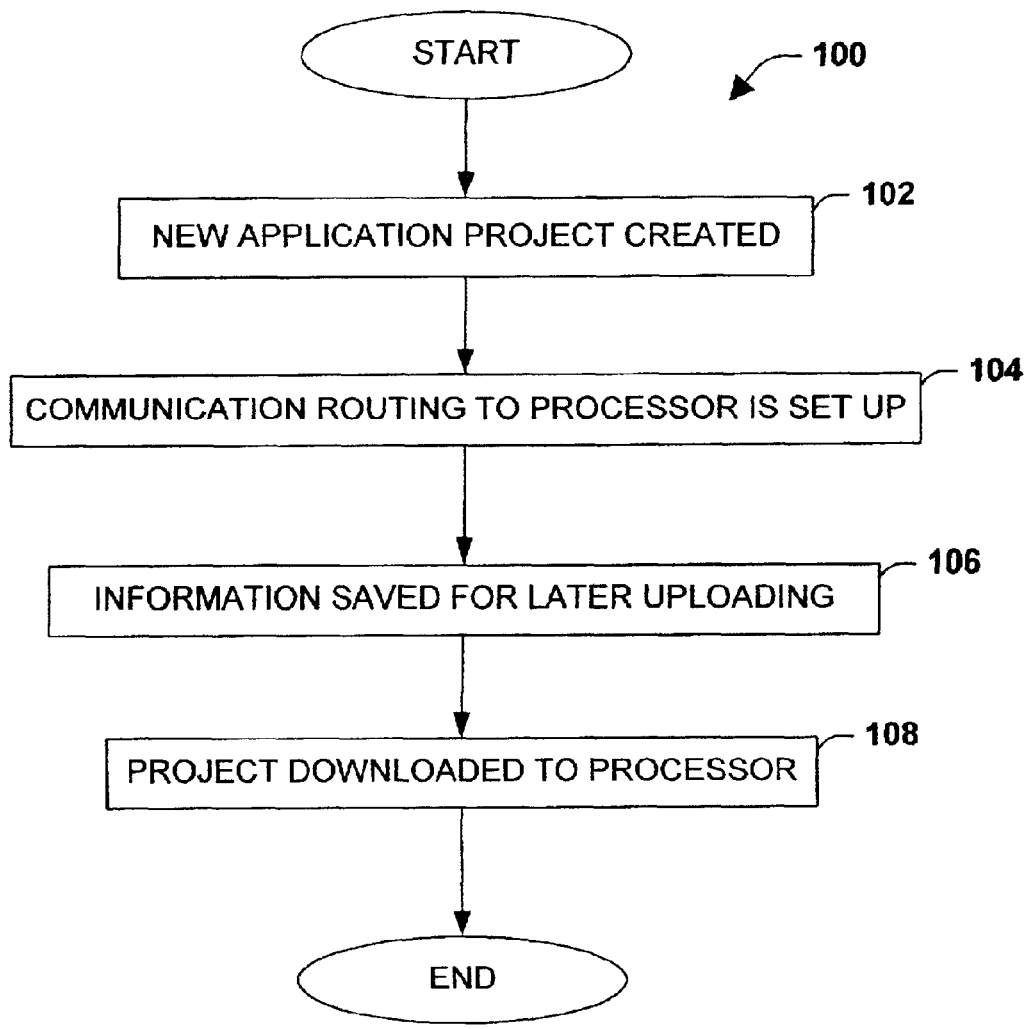
FIG. 5 illustrates a flow diagram of a methodology for downloading a control program to a processor of an industrial controller through the automation interface in accordance with one aspect of the present invention.
Figure 6:
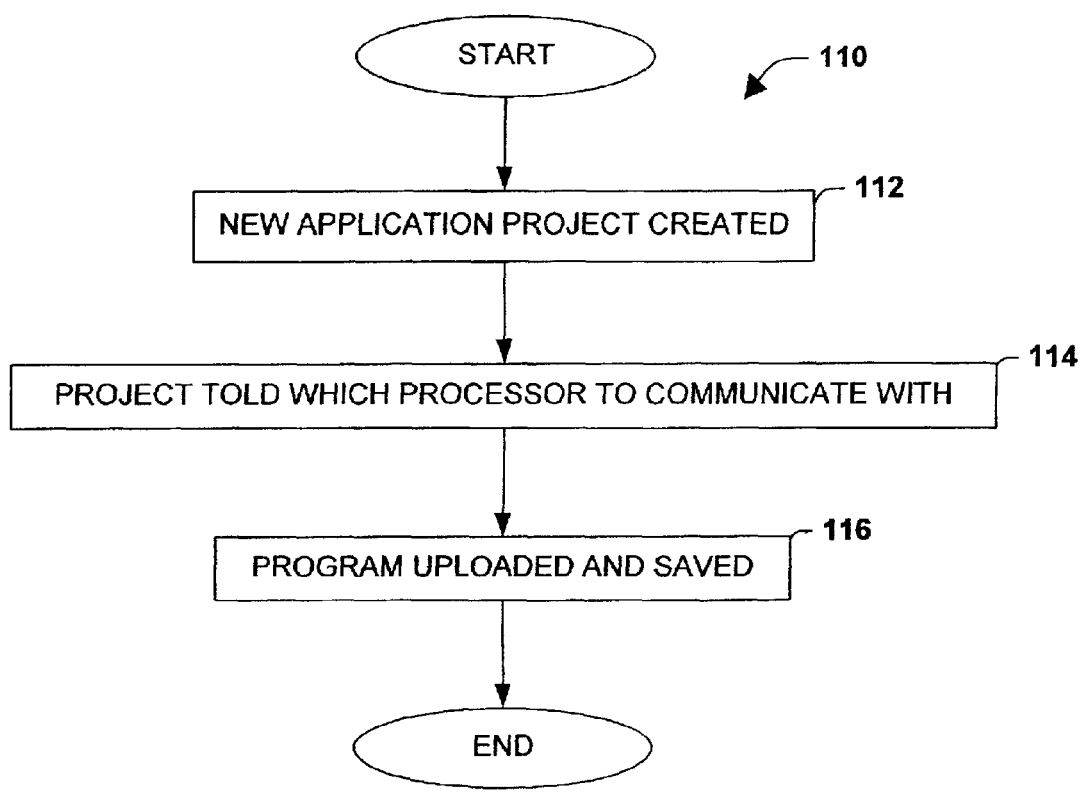
FIG. 6 illustrates a flow diagram of a methodology for uploading a control program to a processor of an industrial controller through the automation interface in accordance with one aspect of the present invention.
Figure 7:
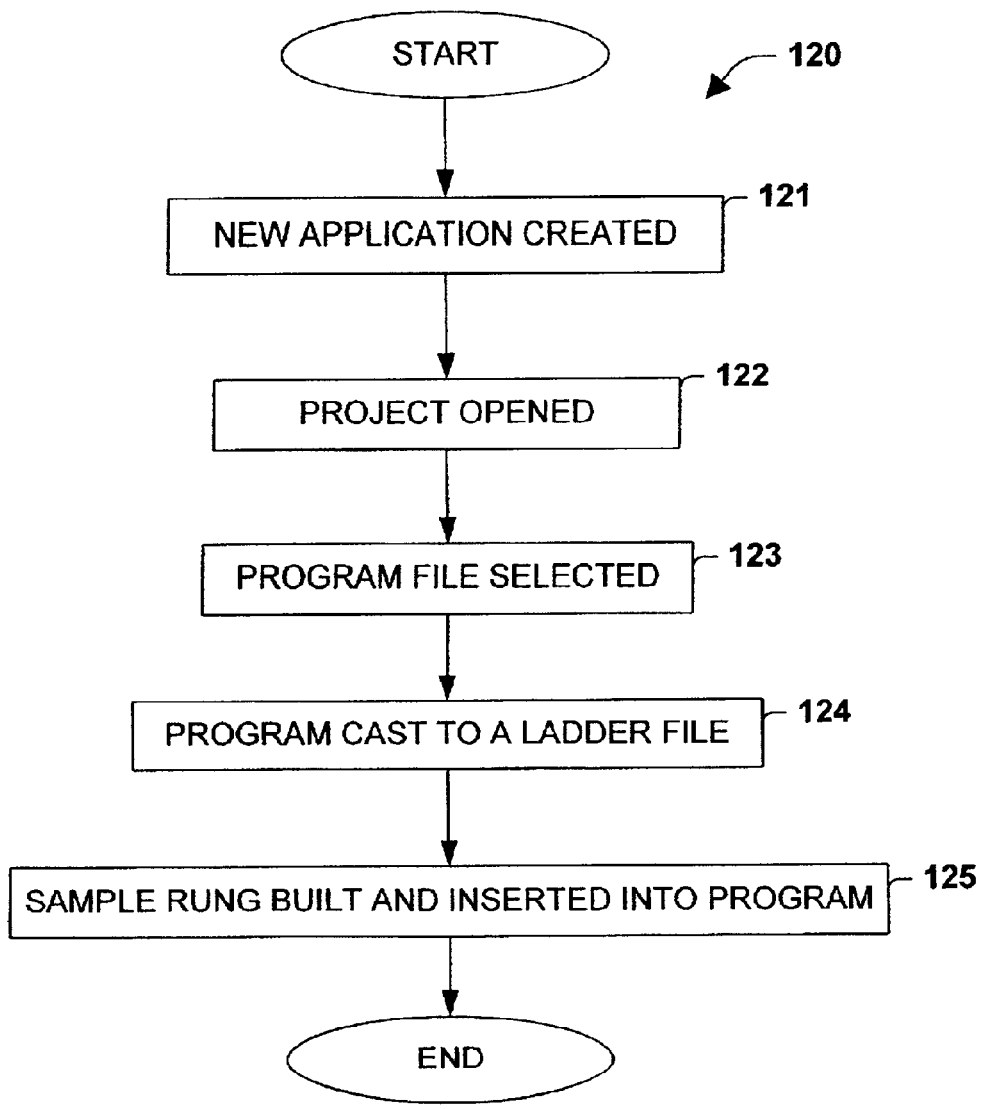
FIG. 7 illustrates a flow diagram of a methodology for inserting a rung into a control program and downloading the control program to a processor of an industrial controller through the automation interface in accordance with one aspect of the present invention.

Since the automation interface is provided with computer process interfaces for communicating between computer processes in executable form, any programming language can be employed to interact and communicate with the automation interface using similar type interfaces on the client application end. FIGS. 5–7 illustrate the use of Visual Basic code for carrying out the functionality of downloading of control programs, uploading of control programs and the insertions of rungs within control programs. The present invention allows for functionality to be grouped into macros, so that individual code instructions can be eliminated for repetitive tasks. A variety of other functionality and computer programming languages can be employed to carry out the present invention.

FIG. 5 illustrates a flow diagram of a methodology 100 for implementing downloading to a processor programmatically in accordance with one aspect of the present invention. The methodology begins at 102 where a new application project is created or instantiated, which is opened from a project residing on a disk. Then, at 104, the communication routing to the actual processor that the project represents is set up in the application when the project is opened. This information is saved for later uploading in 106. The project is then downloaded to the processor in 108.

The following is a sample application module or subroutine written in Visual Basic for implementing the methodology 100 of FIG. 5:

```
Public Sub DownloadAProcessor( )
    Dim g_Application As AutoInterface.Application
    Dim g_Project As AutoInterface.Project
    Dim EncodedRouteData As String
    '** start Project and store it in the g_Application object variable
    Set g_Application=CreateObject("Project.Application")
    '** Declare some variables for clarity.
    Dim ShowDialog As Boolean
    Dim UseAutoSave As Boolean
    Dim IgnorePrompts As Boolean
    Dim OnlineAction As 1gxOnlineAction
    '** Initialize these variables to suitable defaults
    ShowDialog=False
    UseAutoSave=False
    IgnorePrompts=True
    OnlineAction=1gxGoOffline
    '** Open a project from disk that will be downloaded.
    Set g_Project=g_Application.FileOpen ("C:\Projects\Upload.rsp", ShowDialog, UseAutoSave)
    '** The communication route to the actual processor that this project represents is set up in
    '** the application when the project is opened. Get this info out now and save it away for later
    '**calls to upload this processor.
    EncodedRouteData=g_Project.EncodedRouteString
    SaveEncodedRouteData EncodedRouteData
    '** Now download the image to the processor.
    Dim NoError As Boolean
    NoError=g_Project.Download(IgnorePrompts, OnlineAction, 1gxREMOTEPROG) End Sub
```

FIG. 6 illustrates a flow diagram of a methodology 110 for implementing uploading from a processor programmatically in accordance with one aspect of the present invention. At 112, a new application project is created, which initializes routing data. The project is then told which processor to communicate with at 114. Finally, at 116, the function to perform the upload is called and the uploaded program is saved to a file on a disk.

The following is a sample application module or subroutine written in Visual Basic for implementing the methodology 110 of FIG. 6:

```
Public Sub UploadAProcessor( )
    Dim g_Application As AutoInterface.Application
    Dim g_Project As AutoInterface.Project
    Dim EncodedRouteData As String
    '** start Project and store it in the g_Application object variable
```

```
Set g_Application=CreateObject("Project.Application")
'** EncodedRouteData holds a string of data that points
the project software to the processor
'** on the Data Highway+network it will be performing
uploads and downloads on. A
'** function is called here to initialize it to a previously
obtained value
   InitializeRouteData EncodedRouteData
   '** Now tell project which processor it is to communicate
with
   g_Application.EncodedRouteString=EncodedRouteData
   '** Declare some variables for clarity.
   Dim IgnorePrompts As Boolean
   Dim SaveChanges As Boolean
   Dim AcceptDefaultAction As Booloen
   Dim UploadAction As 1gxUploadDownloadAction
   Dim OnlineAction As 1gxOnlineAction
   Dim DataBaseAction As 1gxSaveAction
   '** Initialize these variables to suitable defaults
   IgnorePrompts=True
   SaveChanges=False
   AcceptDefaultAction=True
   UploadAction=1gxUploadCurrent
   OnlineAction=1gxGoOffline
   DataBaseAction=1gxNoAction
   '** Now make the call that performs the upload. Store the
uploaded project object
   Set g_Project=g_Application.Upload(IgnorePrompts,
SaveChanges, UploadAction, _OnlineAction)
   '** Now save the uploaded image to disk as a file called
Upload.rsp
   Dim NoError As Boolean
   NoError=g_Project.SaveAs(IgnorePrompts,
AcceptDefaultAction,    _DataBaseAction,
"C:\Projects\Upload.rsp") End Sub
```

FIG. 7 illustrates a methodology 120 for inserting ladder logic programmatically in accordance with one aspect of the present invention. At 121, a new application is created, which instantiates a new instance of the automation interface. A project is then opened from disk for modification at 122. Then, at 123, a program file is selected for uploading. The selected program is cast to a ladder file at 124. A sample rung is then built and inserted into the selected program at 125.

The following is a sample application module or subroutine written in Visual Basic for implementing the methodology 120 of FIG. 7:

```
Public Sub InsertLadderRung( )
   Dim g_Application As AutoInterface.Application
   Dim g_Project As AutoInterface.LogixProject
   Dim g_ProgFile As AutoInterface.ProgramFile
   Dim g_LadderFile As AutoInterfacc.LadderFile
   '** start AutoInterface and store it in the g_Application
object variable
   Set           g_Application=CreateObject
("AutoInterface.Application")
   '** Declare some variables for clarity.
   Dim ShowDialog As Boolean
   Dim UseAutoSave As Boolean
   Dim IgnorePrompts As Boolean
   Dim AcceptDefaultAction As Boolean
   Dim OnlineAction As 1gxOnlineAction
   '** Initialize these variables to suitable defaults
   ShowDialog=False
   UseAutoSave=False
   IgnorePrompts=True
   AcceptDefaultAction=True
   OnlineAction=1gxGoOffline
   '** Open a project from disk that will be modified.
   Set     g_Project=g_Application.FileOpen
("C:\Projects\Upload.rsp", ShowDialog, UseAutoSave)
   '** Obtain the program file object for program file 2. Cast
this object to a LadderFile object
   '** since in this case, program file 2 is also a ladder file.
   Set g_ProgFile=g_Project.ProgramFiles(2)
   Set g_LadderFile=g_ProgFile
   '** Build up a sample rung manually
   Dim RungString As String
   RungString="SOR XIC B3:0/0 OTE B3:0/1 EOR"
   '** Insert this rung into the ladder at position 0
   g_LadderFile.InsertRungAsAscii 0, RungString
   '** Save the modified project to disk first, then
   '** download the image to the processor and set the
processor to RUN mode.
   '** Once this is completed, the new rung is executing in
the processor.
   Dim NoError As Boolean
   NoError=g_Project.Save(IgnorePrompts,
AcceptDefaultAction)
   NoError=g_Project.Download(IgnorePrompts,
OnlineAction, 1gxREMOTERUN) End Sub
```

It is to be appreciated that the examples of FIGS. 5–7 are for illustrated purposes and most error detection/correction code was omitted for the sake of clarity.

Figure 8:
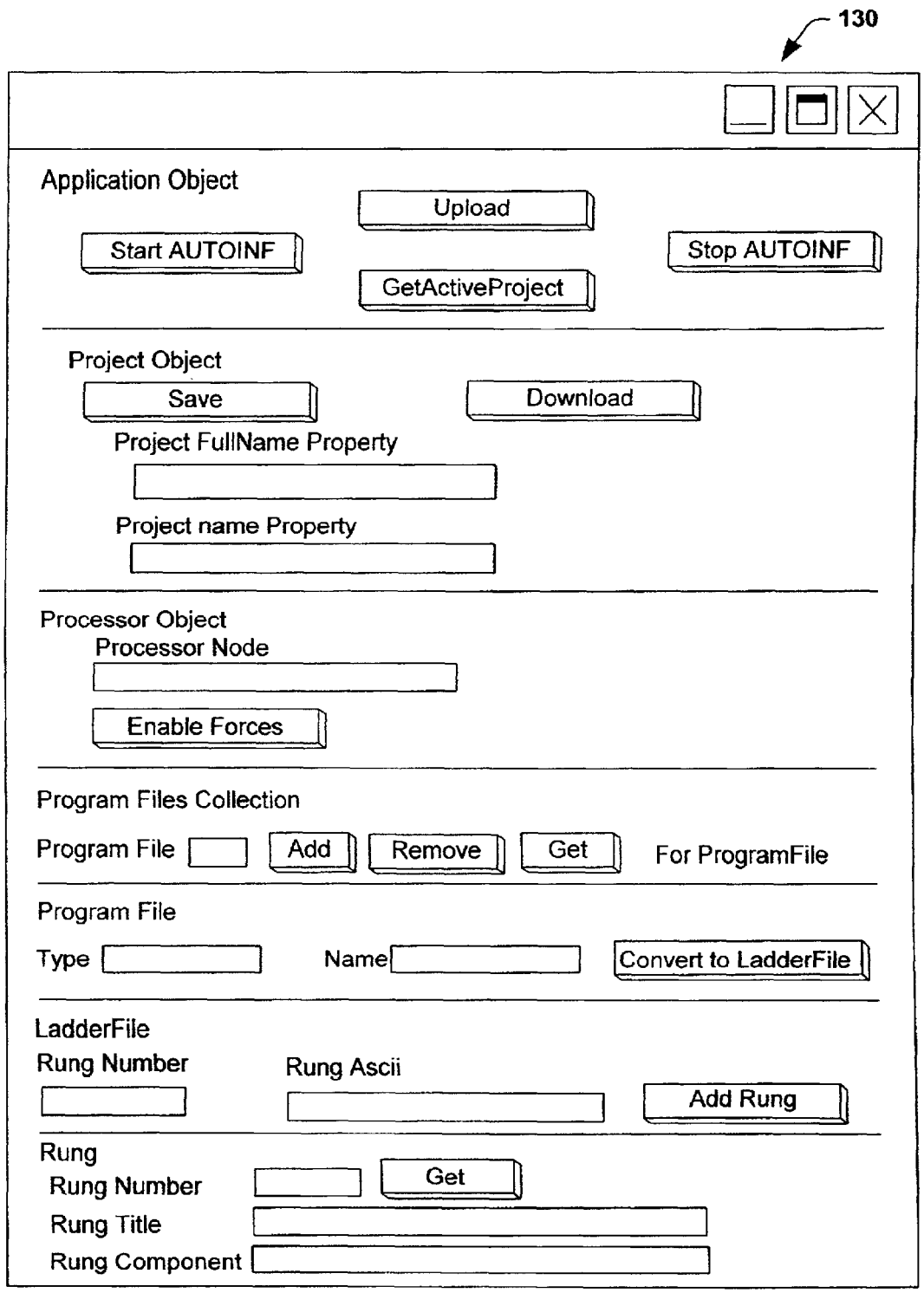
FIG. 8 illustrates a Visual Basic form that provides a variety of functionality for interacting with an industrial controller through the automation interface in accordance with one aspect of the present invention.

A user interface can be provided to interact with the automation interface by utilizing Visual Basic forms. As illustrated in FIG. 8, a Visual Basic form 130 is provided that includes a plurality of buttons and insert spaces for providing data. A button is provided for instantiating an automation interface object, uploading and retrieving an active project and removing the automation interface object from memory. A project object can be saved and downloaded using buttons and a name provided in spaces for saving projects. A processor node can be selected and program files added, removed or retrieved. A program file can be retrieved and converted to a ladder file. The ladder file can then be edited by inserting rungs or deleting rungs to the ladder file. A variety of other functions can be provided utilizing Visual Basic forms.

Figure 9:
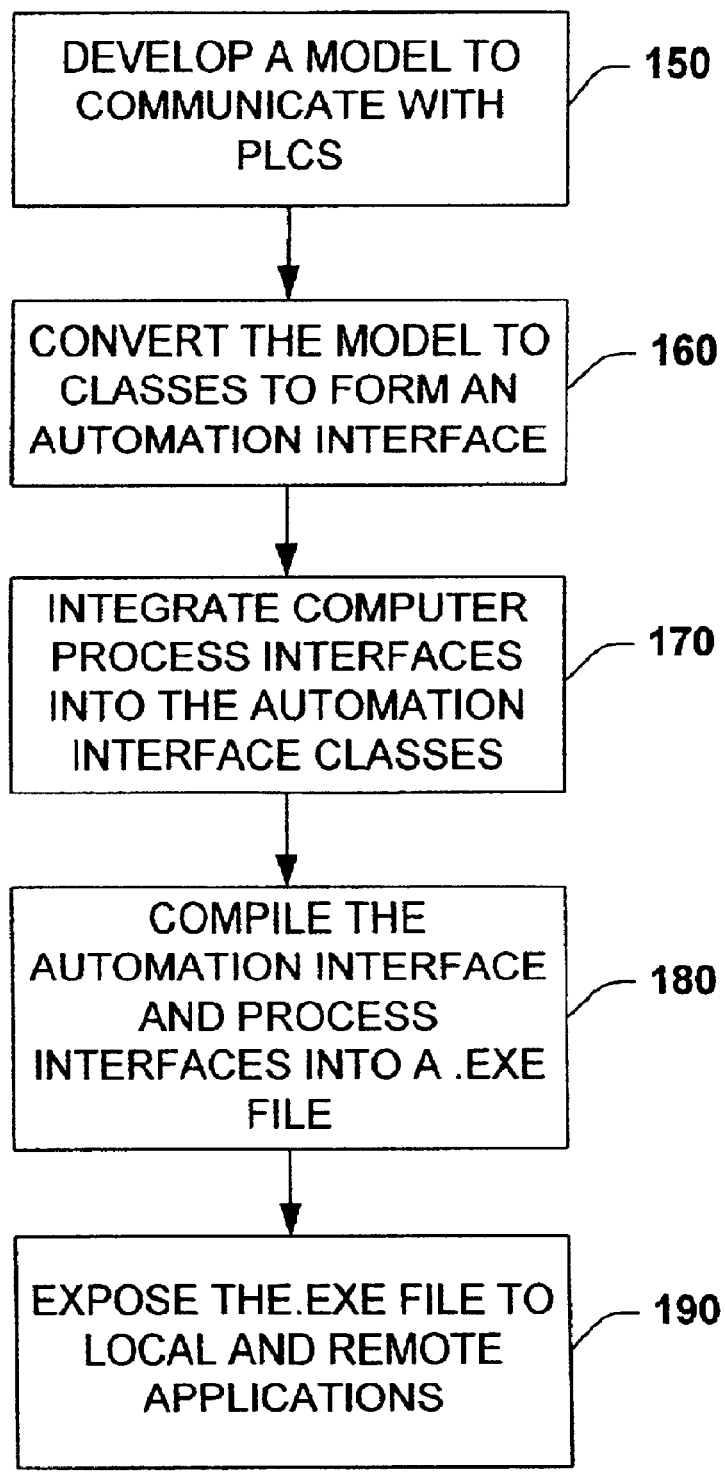
FIG. 9 illustrates a flow diagram of a methodology for providing an automation interface in accordance with one aspect of the present invention.

In view of the foregoing structural and functional features described above, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 9 illustrates one particular methodology for providing an automation interface in accordance with one particular aspect of the present invention. The methodology begins at 150 with the development of a model for communicating with a plurality of industrial controllers or PLCs. The model is then converted to an object or class tree to form an automation interface at 160. For example, the classes can be developed to form COM components or the like (e.g., DCOM, CORBA). At 170, computer process interfaces are integrated into the automation interface (e.g., COM libraries). The automation interface is then compiled into an executable file so that the executable can be accessed by other processes. At 190, the executable file is exposed to local and remote applications by invoking the executable file with the exposed computer process interfaces.

Figure 10:
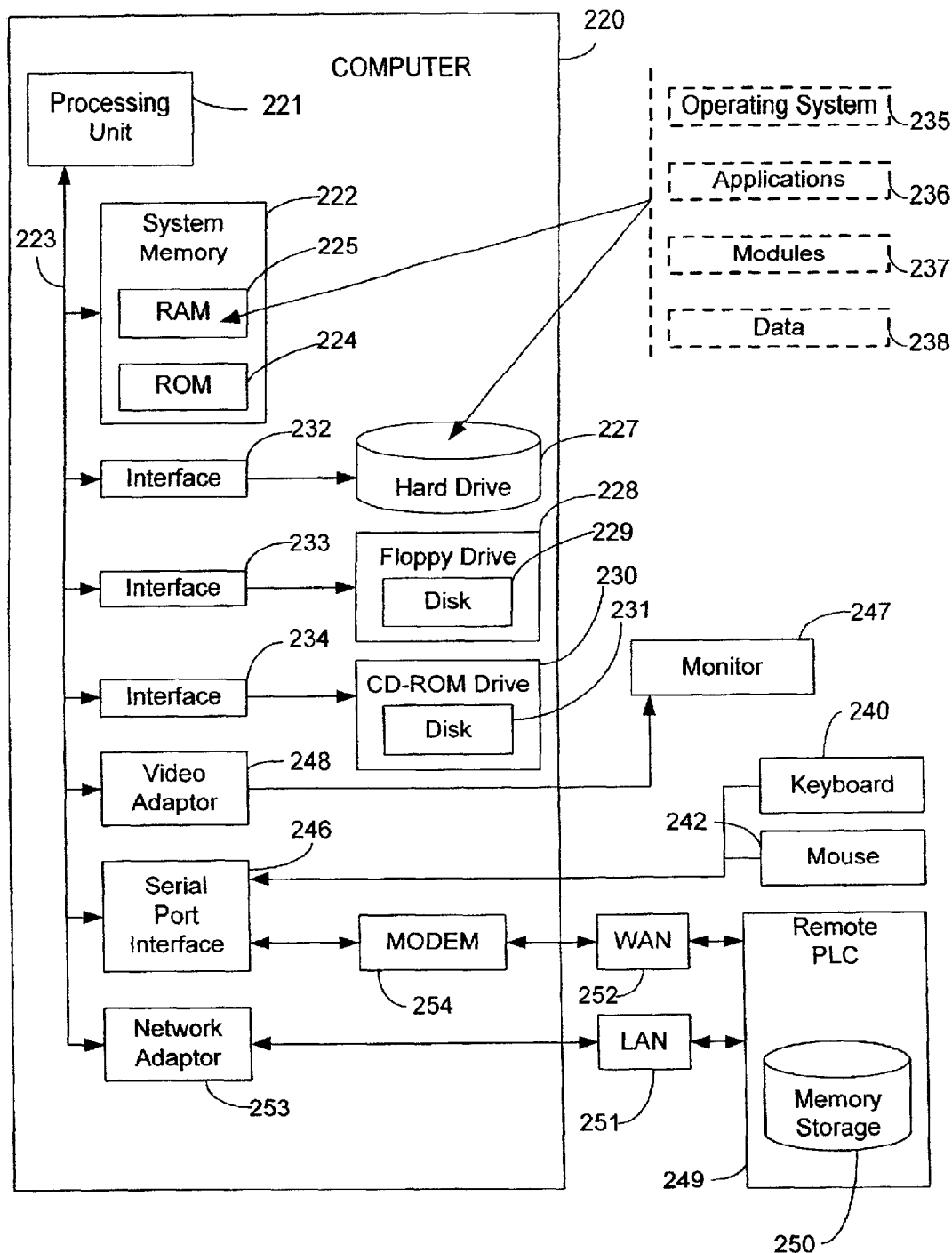
FIG. 10 illustrates a block diagram of a computer system in accordance with an environment of the present invention.

With reference to FIG. 10, an exemplary system for implementing the invention includes a conventional personal or server computer 220, including a processing unit 221, a system memory 222, and a system bus 223 that couples various system components including the system memory to the processing unit 221. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a bard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application programs 236, other program modules 237, and program data 238. A user may enter commands and information into the computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote PLCs, such as a remote PLC 249. Alternatively, the remove PLC 249 may be coupled to a workstation, a server computer, a router, a peer device or other common network node remote device. This remote device can include many or all of the elements described relative to the computer 220, although only a memory storage device 250 has been illustrated in FIG. 10. The logical connections depicted in FIG. 10 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to various aspects of the present invention. Obviously, modifications and alterations will occur to others upon reading and understanding the foregone detailed description. It is intended that the invention be construed as including all such modifications alterations, and equivalents thereof.

What is claimed is:

1. A system for interacting programmatically with an industrial controller, the system comprising:
    an automation interface component adapted to communicate with at least one industrial controller; and
    a computer process interface library comprising object-oriented based objects and classes integrated into the automation interface component, the computer process interface library exposing the automation interface component to a client application process, the client application process communicates with the at least one industrial controller programmatically.

2. The system of claim 1, the computer process interface library being compiled into the automation interface component to provide an executable file.

3. The system of claim 1, the automation interface component being comprised of a plurality of objects, the plurality of objects comprising a top application object for invoking an instance of the automation interface by the client application process.

4. The system of claim 1, the automation interface component comprising functionality for uploading an instruction program from an industrial controller programmatically.

5. The system of claim 1, the automation interface component comprising functionality for downloading an instruction program to an industrial controller programmatically.

6. The system of claim 1, the automation interface component comprising functionality for inserting a rung into a ladder logic instruction program, downloading the ladder logic program to the industrial controller and executing the program programmatically.

7. The system of claim 1, further comprising a client application program functioning as one of a developer, a monitor, an editor and a maintenance system.

8. The system of claim 7, the client application program residing at a remote server and the automation interface residing at a local server connected to one another by a first network, the automation interface being connected to an industrial controller by a second network.

9. The system of claim 8, the first network being one of an intranet and the Internet and the second network being one of a local network and a factory network.

10. The system of claim 1, the automation interface providing access to data of a controlled process associated with an industrial controller.

11. A system for interacting programmatically with an industrial controller, the system comprising:
   an automation interface component adapted to communicate with at least one industrial controller, the automation interface being coupled to a web service for interacting over the Intranet;
   a computer process interface library comprising object-oriented based objects and classes compiled into the automation interface component to provide an executable file with remote access capabilities, the computer process interface library exposing the automation interface component to a client application process, the client application process communicates with the at least one industrial controller programmatically; and
   a client application being coupled to a website for interacting with industrial controllers over the Internet through the automation interface component.

12. The system of claim 11, further comprising a data warehouse coupled to the Internet for storing process control data accessed from one or more industrial controllers by the client application.

13. The system of claim 11, the automation interface comprising functionality for uploading, downloading and editing control programs of an industrial controller programmatically directly to the industrial controller.

14. The system of claim 11, the automation interface comprising functionality for developing and editing ladder logic instruction programs, downloading the ladder logic instruction program to the industrial controller and executing the program programmatically through a client application.

15. A method for providing a mechanism to interact programmatically with an industrial controller, the method comprising:
   developing a plurality of programming components for interacting with an industrial controller;
   integrating computer process interfaces into the plurality of components for providing the plurality of components with remote access capabilities; and
   compiling the automation interface, comprising object-oriented based objects and classes, and process interfaces into an executable file.

16. The method of claim 15, the developing of a plurality of programming components for interacting with an industrial controller comprising developing a model to communicate various functions associated with the industrial controller.

17. The method of claim 15, further comprising exposing the executable file to local and remote applications.

18. The method of claim 17, the exposing the executable file to local and remote applications comprising exposing the executable file to the Internet via a web service.

19. The method of claim 15, the developing a plurality of programming components for interacting with an industrial controller comprising providing a component having functionality for uploading an instruction program from an industrial controller programmatically.

20. The method of claim 15, the developing a plurality of programming components for interacting with an industrial controller comprising providing a component having functionality for downloading an instruction program to an industrial controller programmatically.

21. The method of claim 15, the developing a plurality of programming components for interacting with an industrial controller comprising providing a component having functionality for inserting a rung into a ladder logic instruction program.

22. The method of claim 15, further comprising providing a client application program functioning as one of a developer, a monitor, an editor and a maintenance system.

23. A computer readable medium having computer-executable components comprising:
   an automation interface component having functionality to interact and provide various services to an industrial controller; and
   an interface library comprising object-oriented based objects and classes compiled into the automation interface component, the interface library exposing the automation interface component to client application procesess, the client application processes communicate with the at least one industrial controller programmatically.

24. The computer readable medium of claim 23, the automation interface comprising functionality for uploading an instruction program for an industrial controller programmatically.

25. The computer readable medium of claim 23, the automation interface comprising functionality for downloading an instruction program to an industrial controller programmatically.

26. The computer readable medium of claim 23, the automation interface comprising functionality for inserting a rung into a ladder logic instruction program, downloading the ladder logic program to the industrial controller and executing the program programmatically.

* * * * *